US012085061B2

(12) United States Patent
Randall (10) Patent No.: US 12,085,061 B2
(45) Date of Patent: Sep. 10, 2024

(54) METHOD FOR STABILISING A WIND TURBINE BLADE (71) Applicant: Vestas Wind Systems A/S, Aarhus N (DK)

(72) Inventor: Stephen Randall, Cowes (GB)

(73) Assignee: Vestas Wind Systems A/S, Aarhus N. (DK)

( * ) Notice: Subject to any disclaimer, the term of this patent is extended or adjusted under 35 U.S.C. 154(b) by 35 days.

(21) Appl. No.: 17/784,201

(22) PCT Filed: Dec. 18, 2020

(86) PCT No.: PCT/DK2020/050389
§ 371 (c)(1),
(2) Date: Jun. 10, 2022

(87) PCT Pub. No.: WO2021/136568
PCT Pub. Date: Jul. 8, 2021

(65) Prior Publication Data
US 2023/0035429 A1    Feb. 2, 2023

(30) Foreign Application Priority Data
Dec. 30, 2019   (DK) .......................... PA 2019 70839

(51) Int. Cl.
*F03D 7/02*    (2006.01)
(52) U.S. Cl.
CPC ........ *F03D 7/0296* (2013.01); *F05B 2260/83* (2013.01); *F05B 2260/96* (2013.01)
(58) Field of Classification Search
CPC ........................... F03D 7/0296; F05B 2260/96
See application file for complete search history.

(56) References Cited

U.S. PATENT DOCUMENTS 11,359,604 B2 *  6/2022  Pedersen ................ F03D 17/00
2012/0134813 A1  5/2012  Nies et al.

FOREIGN PATENT DOCUMENTS

| EP | 1101034 A1 | 5/2001 | |
|----|------------|--------|---|
| EP | 2267298 A2 | 12/2010 | |
| EP | 3293392 A1 * | 3/2018 | ........... F03D 1/0633 |
| GB | 2452488 A | 3/2009 | |
| WO | 2011067304 A1 | 6/2011 | |
| WO | 2019001661 A1 | 1/2019 | |

OTHER PUBLICATIONS

Danish Patent and Trademark Office, Search and Examination Report in PA 2019 70839, Jul. 13, 2020.
Danish Patent and Trademark Office, Amended Examination Report in PA 2019 70839, Jul. 13, 2020.
European Patent Office, International Search Report and Written Opinion in PCT Application No. PCT/DK2020/050389, Mar. 19, 2021.
European Patent Office, Examination Report issued in corresponding European Application No. 20828755.7, dated Jul. 19, 2023.

* cited by examiner

*Primary Examiner* — Sabbir Hasan
(74) *Attorney, Agent, or Firm* — Wood Herron & Evans LLP (57) ABSTRACT

The invention provides a method for stabilising a wind turbine blade (106), the method comprising, attaching (S2) an air blowing arrangement (201) to the blade, detecting (S4) an oscillation of the blade, and operating (S5) the attached air blowing arrangement to provide a thrust to counteract the oscillation.

19 Claims, 7 Drawing Sheets

METHOD FOR STABILISING A WIND TURBINE BLADE

TECHNICAL FIELD

The present invention relates to a method for stabilising a wind turbine blade. The invention also relates to a computer program, a computer readable medium, and a control unit for performing steps a method for stabilising a wind turbine blade. The invention further relates to an apparatus for counteracting an oscillation of a wind turbine blade.

BACKGROUND INFORMATION

A horizontal axis wind turbine is known to have an electric generator in a nacelle on top of a tower, where a rotor, with one or more blades, with a substantially horizontal axis, is mounted to the nacelle and arranged to drive the generator.

In normal operation such as during power generation, a yaw drive turns the nacelle so that it points the rotor hub into the wind and pitch drives adjusts the blades of the wind turbine so that they are positioned with an angle of attack which creates lift and causes the rotor to turn. The pitch of the blades can then be adjusted so that the force they experience from the wind is maintained within safe operating parameters, while generating as much energy from the incident wind as possible.

When the wind turbine is not generating power, such as before connection to the grid or during times of maintenance, the blades of the turbine are, to the greatest extent as possible, turned out of the wind by means of the yaw drive and pitch drives so that the blades do not experience much force from the incident wind. This position of the blades is known as a "feathered" position. In this position, the wind turbine blades may be brought to a standstill, and the rotor may optionally be locked. When the wind turbine blades are feathered with respect to the wind, the wind flows around the blades smoothly, but without generating lift. This condition can be maintained when the wind direction changes by adjusting the yaw angle of the nacelle to maintain, as much as possible, an approximate alignment between the blade chordwise direction and the wind direction, or, expressed differently, to maintain an angle of attack between the blades and the wind direction which is neutral, that is to say, which generates substantially no lift.

In certain situations, a wind turbine's adjustment drive mechanisms may be disabled or without power. The power may have been shut off. For example, this may be necessary for a service procedure on the wind turbine. Also, during construction and pre-commissioning, a wind turbine is typically without power. Without power to adjust the rotor yaw or blade pitch, it may be impossible to maintain a feathered aspect of the wind turbine blades in relation to the wind in situations in which the wind direction changes. This can result in a situation in which the flow of air around the blades is wholly or partly from one side. It is thought that this can lead to a phenomenon known as vortex shedding.

More particularly, vortex shedding may be caused by an unstable flow of air around the rotor blade, particularly the leading edge, when the blade is fixed and pitched at a substantially transverse angle to the wind. The air flows around the blade, but it cannot stay attached to the blade surface. The reason may be that the blade is not pitched correctly to support lift. As a result, an attached air flow may briefly occur, to then be lost. This may result in the formation of a vortex in the flow on the leeward side of the blade. This phenomenon may be referred to as a vortex shedding flow. It has the characteristic that the separations in the air tend to shift from one side of the blade to the other in a rhythmic manner.

This rhythmic flow separation may cause a deformation oscillation of the blade. The oscillation is usually be an edgewise oscillation. Edgewise is the direction from the leading edge to the trailing edge of the blade, i.e. in the direction of a chord of the blade. This oscillation may typically occur first at the tip of the blade. The reason may be that the reduced diameter and lighter frame of the tip region offer less resistance to the rhythmically shifting force provided by the air. If the oscillation provided by the air flow corresponds to the resonance frequency of the blade itself, the amplitude of the oscillation may increase. Thereby, the blade can eventually suffer a potentially catastrophic failure.

Thus, it can be appreciated that when a rotor of a wind turbine is at a standstill, and there is no power to the wind turbine blade or rotor adjustment systems, the blades may be prone to an edgewise oscillation resulting from the air flow around them, e.g. when the wind hits the blades from the side. Consequently, and if the magnitude of the induced oscillation is large enough, notwithstanding the strength of the blade structure, the edgewise oscillation can result in damage to a blade. Such damage may be costly and time consuming to repair.

A wind turbine may comprise mechanical or hydraulic devices that dampen oscillations induced in a blade before they develop a magnitude that is sufficient to damage the blade. An example is presented in EP1101034. However, such devices can be expensive and difficult to install. Moreover, they may not be adapted to retrofitting, It has been suggested, e.g. in WO2011/067304, to apply a releasably attachable, temporary blade cover to wind turbine blades to provide a non-aerodynamic outer surface, for preventing blade oscillation by disrupting airflow across them. In particular, it has been suggested to apply a blade cover in the form of a textured sleeve, such as a net-like sleeve. This device has been found to be effective in preventing edgewise oscillations of the blades when the wind turbine is idle, possibly with the rotor at a standstill. It is thought the effectiveness of a textured sleeve lies in its ability to interrupt any vortex-shedding effect around the blade.

However, one problem with such blade covers is that they create waste. In some cases, they can be burdensome to apply and remove. There is therefore a desire to find an alternative way of stabilising the blades of a wind turbine, in situations where there is no power to the yaw and pitch drives of the turbine.

SUMMARY OF THE INVENTION

It is an object of the present invention to avoid or minimise oscillations of a wind turbine blade. It is another object of the present invention to avoid or minimise oscillations of a wind turbine blade, where there is no power to blade or rotor adjustment systems of the turbine. It is a further object of the present invention to avoid or minimise oscillations of a wind turbine blade, while minimising the amount of waste created as a result of the oscillation avoidance or minimisation.

The objects are reached with a method according to claim 1. Thus, the invention provides a method for stabilising a wind turbine blade, the method comprising, attaching an air blowing arrangement to the blade,
detecting an oscillation of the blade, and operating the attached air blowing arrangement o provide a thrust to counteract the oscillation.

The air blowing arrangement may comprise one or more blowers. The blower may be provided as an aerodynamic thruster. The blower may be provided as a fan, such as tunnel fan. The blower may comprise a propeller. The propeller be driven by any suitable means. For example, the propeller may be driven by a motor, which may be electric, hydraulic, or pneumatic. In some embodiments, the propeller may be driven by an internal combustion engine. The blower may even be a turbojet engine, or a turbo fan engine.

The oscillations may in particular comprise repeated deformations of the blade, especially rhythmic deformations. In other words, an oscillation may comprise two sequential deformations of a blade in opposite directions. The oscillation may in particular comprise first and second alternating movements in opposite directions. The oscillation may comprise alternating movements of a portion of the blade, while another portion is static. The oscillation may be wind-induced. The oscillation may be caused by vortex shedding.

The detection of the oscillation may be done by means of one or more sensors. The sensor may be an accelerometer. The second may be a strain gauge. The strain gauge may be arranged to detect strains in a part of the blade, due to the oscillation.

The thrust, counteracting the oscillation, may be an air movement. The air movement may apply a reaction force to the blade, by virtue of the air blowing arrangement being attached to it. The reaction force may counteract the oscillation.

The invention provides for detecting and counteracting blade oscillations, without the need for power to the wind turbine or to blade or rotor adjustment systems thereof. The invention thereby provides a solution to some drawbacks with existing solutions, such as from the use of the known temporary blade covers, described above.

Where the wind turbine comprises a plurality of blades, all blades may have respective air blowing arrangements attached to them. Thereby, oscillations in any or all of the blades may be detected, and the respective air blowing arrangements may be operated to counteract the respective oscillations.

As mentioned, a single oscillation may comprise first and second alternating movements in opposite directions. Preferably, the air blowing arrangement is operated to provide a first thrust in a direction which is at least partly the same as the direction of the first movement. Thereby, the first thrust may provide, by the attachment of the air blowing arrangement to the blade, a reaction force to the blade in a direction opposite to the thrust direction, and thereby at least partly opposite to the first movement direction. The first thrust having a direction which is at least partly the same as the direction of the first movement, may mean that where the first thrust, and the first movement direction, are represented by vectors, the angle between the vectors is less than 90 degrees.

Preferably, the air blowing arrangement is operated to provide a sequence of first thrusts, synchonised with the oscillation, in a direction which is at least partly the same as the direction of the first movement. Thereby, the first thrust may be repeated in conjunction with repeated oscillation movements. The first thrusts may be provided with a frequency which is the same, or a multiple of, a frequency of the oscillation. The air blowing arrangement may be actuated in synchronization with the oscillation motion, to counteract any individual movement stroke of the oscillation. Thereby, the first thrusts may provide respective reaction forces in a direction which is at least partly opposite to the direction of the first movement. Thereby the oscillation may be effectively dampened.

Preferably, the air blowing arrangement is operated to provide a second thrust in a direction which is at least partly the same as the direction of the second movement. Thereby, the second thrust may provide, by the attachment of the air blowing arrangement to the blade, a reaction force to the blade in a direction opposite to the second thrust direction, and thereby at least partly opposite to the second movement direction. The air blowing arrangement may be operated to provide sequence of second thrusts, synchonised with the oscillation, in a direction which is at least partly the same as the direction of the second movement. The second thrust having a direction which is at least partly the same as the direction of the second movement, may mean that where the second thrust, and the second movement direction, are represented by vectors, the angle between the vectors is less than 90 degrees. Thereby, the second thrusts may provide respective reaction forces in a direction which is at least partly opposite to the direction of the second movement. The second thrusts may be provided with a frequency which is the same, or a multiple of, a frequency of the oscillation.

Thus, the air blowing arrangement may provide thrusts in both directions, i.e. in the first and second directions. For example, the air blowing arrangement may comprise two blowers arranged to provide respective thrusts in opposite directions. The thrusts of the blowers may be repeated alternatingly. This may be done in synchronization with the oscillation. Each blower may provide the repeated thrusts by a rotational speed control of one or more propellers of the respective blower. Alternatively, each blower may provide the repeated thrusts by a blade pitch control of one or more propellers of the respective blower.

In some embodiments, the air blowing arrangement may comprise a duct arrangement, adapted to provide alternating, opposite thrusts by means of a thrust guiding device. This may be done in synchronization with the oscillation. The thrust guiding device may comprise one or more valves, vanes, or other movable air flow guiding devices.

However, in some embodiments, the air blowing arrangement may provide a thrust in only one direction. Thereby, one of the oscillation movement strokes may be left not counteracted.

For the control of the air blowing arrangement, the method may comprise determining a frequency of the oscillation. Thereby, thrusts of the air blowing arrangement may be synchronised with the oscillation, in dependence on the determined oscillation frequency. The air blowing arrangement may be operated to provide a thrust with a frequency which is the same as, or a multiple of, the frequency of the oscillation. The air blowing arrangement may produce thrusts to oppose the oscillation, thus stabilising the blade in a way which is similar to that of active noise cancelling.

The steps of detecting an oscillation, and operating the air blowing arrangement to counteract the oscillation may be carried out while a blade or rotor is mounted to a wind turbine hub.

The oscillation may be an edgewise, flapwise, and/or torsional oscillation. The oscillation may be an edgewise oscillation, a flapwise oscillation, a torsional oscillation, a combination of any two of these oscillations, or a combination of all three oscillations. The oscillation may have the greatest amplitude at a tip end of the blade. The tip end may be opposite to a root end of the blade, which is adapted to be mounted to a hub of a wind turbine. The oscillation may have a gradually decreasing amplitude towards the root end of the blade. An edgewise oscillation is an oscillation substantially in parallel with a chord of the blade. A flapwise oscillation is an oscillation substantially perpendicular with the chord of the blade. A torsional oscillation is an oscillation substantially around a longitudinal axis of the blade.

Preferably, where the blade comprises a tip end, and a root end adapted to be mounted to a hub of a wind turbine, the air blowing arrangement is attached closer to the tip end than to the root end. Thereby, the air blowing arrangement is preferably attached to a blade at or close to a location along its length where the oscillation has the greatest amplitude, e.g. at or near a tip of the blade. The oscillation counteracting force may in particular be most effective at a blade tip or tip region. Thereby, an effective oscillation counteraction may be provided with a relatively low level of the thrust from the air blowing arrangement.

In some embodiments, where the blade is mounted to a wind turbine hub, the blade is, during the step of attaching the air blowing arrangement to the blade, parked in a 6 o'clock position. Thereby, the blade may point straight down from the hub. Thereby a tip region of the blade may be relatively close to the bottom of the tower of the wind turbine. Thereby, the air blowing arrangement may be easily attached to the blade by means of a lifting device. The lifting device may be positioned on the ground, or, in the case of an off-shore turbine, on a platform at the foundation, or on a marine vessel. The lifting device may be, for example, a crane, a cherry picker, or a telescopic handler.

When the air blowing arrangement has been attached to the blade, the rotor may be rotated to position another blade of the wind turbine in the 6 o'clock position. Thereby a further air blowing arrangement may be attached to the other blade. This may be repeated until air blowing arrangements have been attached to all blades of the wind turbine. However, in some embodiments, a blower per aspects of the invention may be pre-attached to a blade, before attachment of the blade to a hub of the wind turbine. In any case, the blower arrangements may be removed from the respective blades after the wind turbine has been commissioned, i.e. with its blade-adjustment and/or yaw systems brought into a working condition.

The steps of detecting oscillation of a blade, and operating the attached air blowing arrangement to provide a thrust to counteract the oscillation, may be carried out in any position of the blade or rotor. A step of attaching a blowing arrangement may also be carried out in any rotational position of a blade or rotor, e.g. in a so-called 12, 6, 3, or 9 o'clock blade position, or any position between two of said positions. It may be easier and therefore preferred, to attach a blowing arrangement to a blade while it is in a so-called 6-o'clock position, attached to a wind turbine nacelle hub.

The objects are also reached with an aspect of the invention, providing a method for stabilising a wind turbine blade, the method comprising,
  receiving signals indicative of an oscillation of the blade, and
  controlling, in dependence on the signals, an air blowing arrangement attached to the blade, to provide a thrust to counteract the oscillation.

The method of this aspect may comprise, comprising determining, in dependence on the signals, a frequency of the oscillation. The method of this aspect may further comprise controlling the air blowing arrangement to provide a synchronised thrust with a frequency which is the same as, or a multiple of, the frequency of the oscillation. The step of attaching a blowing arrangement to a wind turbine blade may preferably comprise attaching a blowing arrangement to a wind turbine blade which is installed at a wind turbine hub. The step of attaching a blowing arrangement to a wind turbine blade may preferably comprise attaching a blowing arrangement to each wind turbine blade of a wind turbine rotor at an installed wind turbine nacelle. The step of attaching a blowing arrangement to a wind turbine blade may preferably comprise attaching a blowing arrangement to a wind turbine blade of a wind turbine which is de-powered or whose nacelle yaw and/or blade-pitching systems are de-powered or otherwise non-operational. The method may include de-powering a wind turbine prior to the steps of attaching a blowing arrangement to one or more blades. Such a step may be required e.g. during a service intervention on an operational wind turbine, which intervention requires shutting down and de-powering of the wind turbine. Alternatively, the method may include de-powering a pitching system of a wind turbine blade prior to the steps of attaching a blowing arrangement to said blades.

The objects are also reached with a computer program comprising program code means for performing steps of any embodiment of the method according to said aspect, when said program is run on a computer. The objects are also reached with a computer readable medium carrying a computer program comprising program code means for performing steps of any embodiment of the method according to said aspect, when said program product is run on a computer. The objects are also reached with a control unit configured to perform the steps of any embodiment of the method according to said aspect of the invention. Thus, the objects are also reached with a computer program according to claim 12, a computer readable medium according to claim 13, or a control unit according to claim 14.

The objects are also reached with an apparatus for counteracting an oscillation of a wind turbine blade, the apparatus comprising,
  an air blowing arrangement comprising an attachment device for attaching the air blowing arrangement to the blade,
  a sensor for detecting an oscillation of the blade, and
  a control unit adapted to control the attached air blowing arrangement, in dependence on signals from the sensor, to provide a thrust to counteract the oscillation.

The sensor may be any of any suitable type, e.g. an accelerometer, or a strain gauge. The sensor may be arranged to send the signals to the control unit. This may be done by a wire connection, or wirelessly, e.g. by means of radio communication. The thrust to counteract the oscillation may be a synchronised sequence of thrusts, in particular, a synchronised sequence of thrusts on opposite directions.

The control unit may be adapted to determine, in dependence on the signals, a frequency of the oscillation. The control unit may be adapted to control the air blowing arrangement to provide a synchronised thrust with a frequency which is the same as, or a multiple of, the frequency of the oscillation.

The control unit may be arranged to control one or more control devices of the air blowing apparatus. This may be done by a wire connection, or wirelessly, e.g. by means of radio communication.

Examples of a blower of the air blowing arrangement have been mentioned above. The attachment device, for attaching the air blowing arrangement to the blade, may be in any suitable form. For example, the attachment device may comprise a gripping device, with one or more surfaces which are complementary to a surface of a part of the blade. The gripping device may be arranged to at least partly surround the blade, transversally to a longitudinal direction of the blade. The gripping device may be adapted to be held to the blade by a clamping force and/or one or more high friction blade contact surfaces thereof.

The air blowing arrangement may be arranged to be operated so as to provide a thrust to provide a reaction force to the blade in a direction opposite to a movement direction of the blade. The air blowing arrangement may be adapted to be operated so as to provide a sequence of thrusts, synchonised with the oscillation. The air blowing arrangement may be adapted to provide thrusts in two substantially opposite directions. For example, the air blowing arrangement may comprise two blowers arranged to provide respective thrusts in opposite directions. In some embodiments, the air blowing arrangement may comprise a duct arrangement, adapted to provide alternating, opposite thrusts by means of a thrust guiding device. However, in some embodiments, the air blowing arrangement may be arranged to provide a thrust in only one direction.

BRIEF DESCRIPTION OF THE DRAWINGS

Below, embodiments of the invention will be described with reference to the drawings, in which.

DETAILED DESCRIPTION OF EMBODIMENTS

Figure 1:
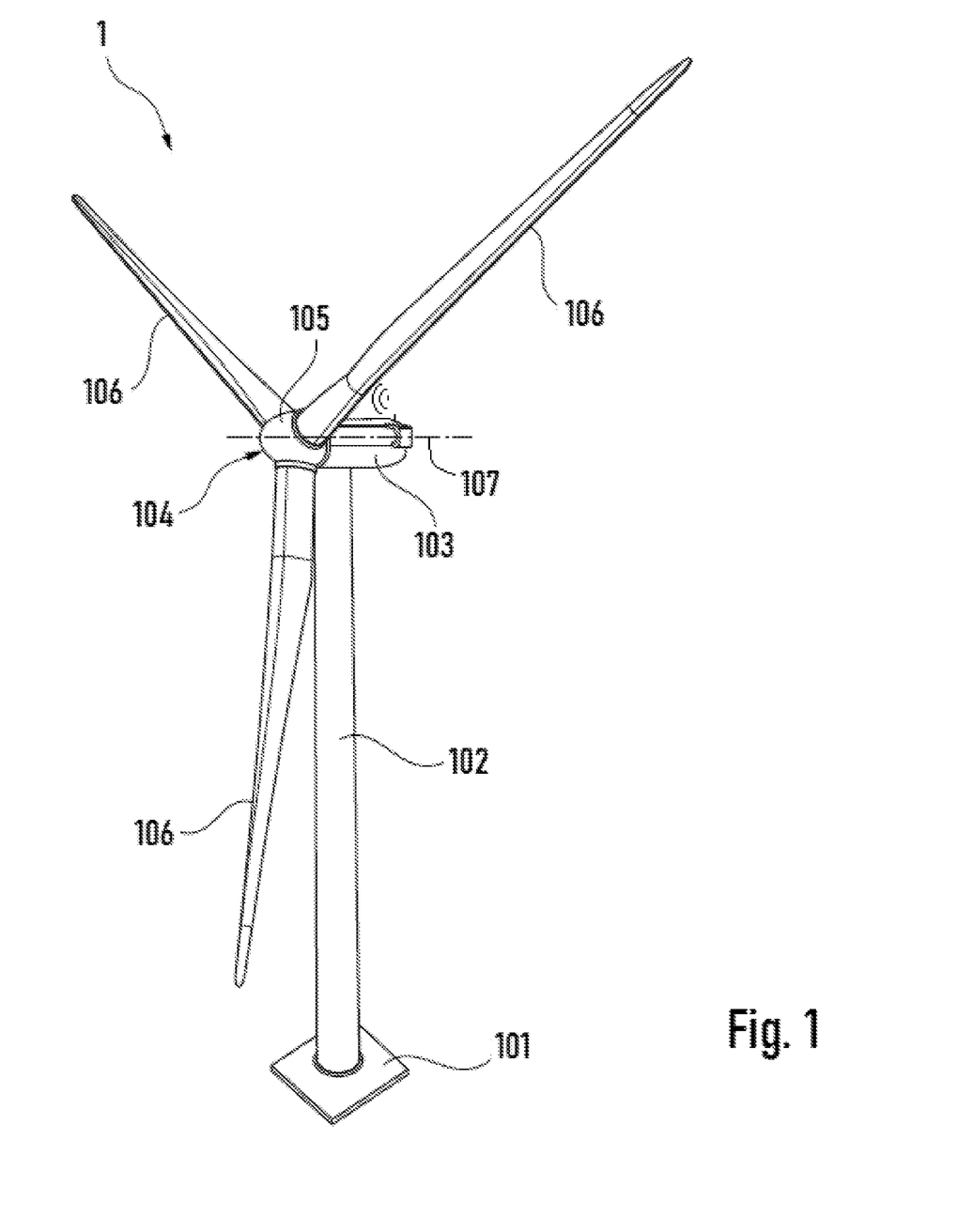
FIG. 1 shows a perspective view of a wind turbine.

Reference is made to FIG. 1. A wind turbine 1 may include a foundation 101, and a tower 102 coupled to the foundation 101 at a lower end thereof. A wind turbine component, in the form of a nacelle 103, may be disposed at the apex of the tower 102. A rotor 104 may be operatively coupled to a generator housed inside the nacelle 103. The rotor 104 of the wind turbine 1 may serve as the prime mover for an electromechanical system of the wind turbine. In addition to the generator, the nacelle 103 may house miscellaneous components required for converting wind energy into electrical energy. The nacelle 103 may also house various components needed to operate, control, and optimize the performance of the wind turbine 1. While an on-shore wind turbine 1 is illustrated in FIG. 1, it should be recognised that embodiments of the present invention may also be used for off-shore wind turbines as well.

The rotor 104 of wind turbine 1 may include a wind turbine component, in the form of a central hub 105. One or more blades 106 may project outwardly from the central hub 105. In the representative embodiment, the rotor 104 includes three blades 106, but the number may vary. The wind turbine may be a horizontal-axis wind turbine. The blades 106 may be configured to interact with the passing air flow to produce lift that causes the rotor 104 to rotate about a substantially horizontal axis 107.

Figure 2:
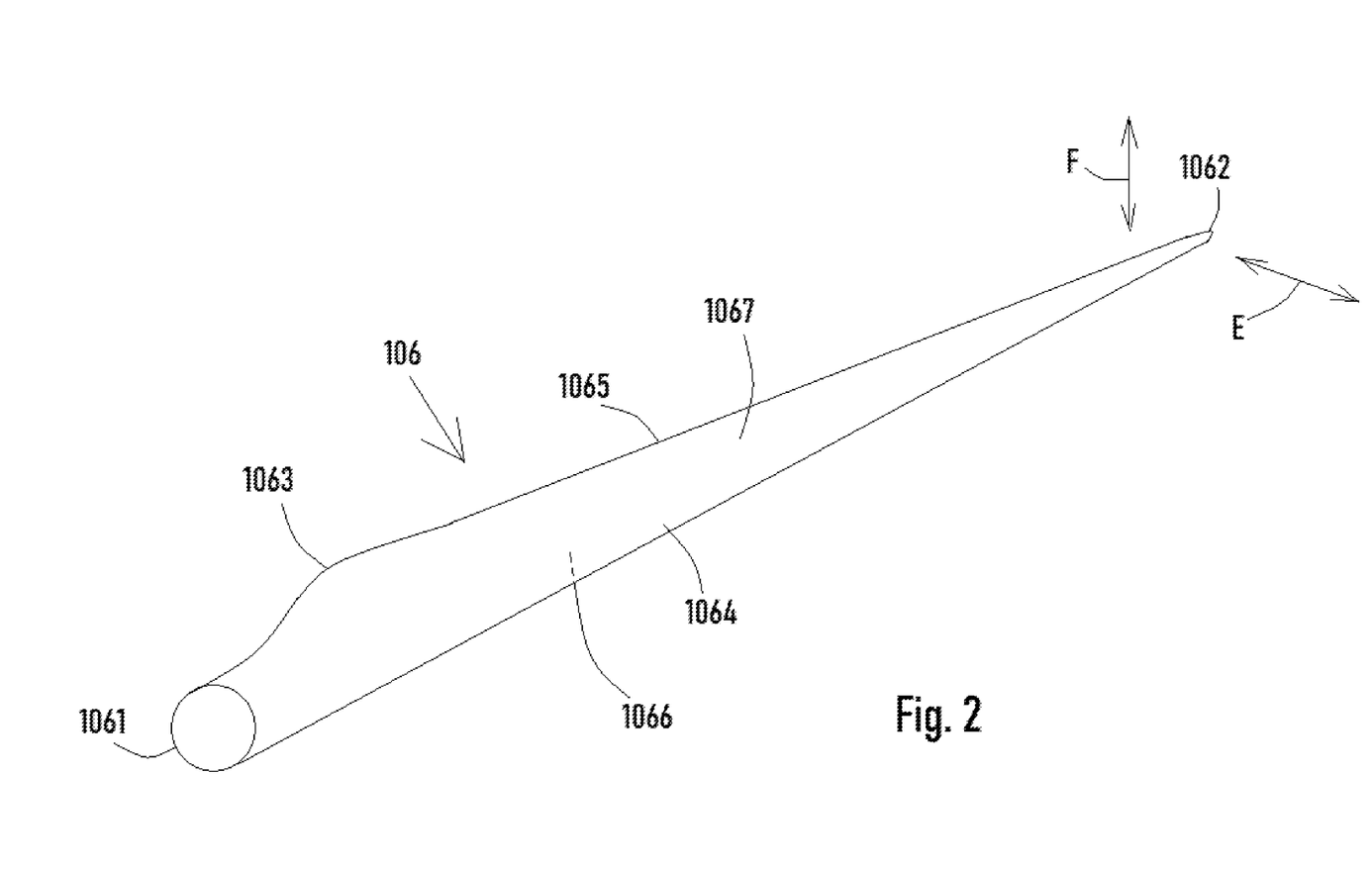
FIG. 2 shows a perspective view of a wind turbine blade.

FIG. 2 is a view of one of the blades 106 of the wind turbine 1. The blade 106 extends from a generally circular root end 1061 to a tip end 1062 in a longitudinal direction. The blade may be of any suitable length, e.g. in the interval 30-90 metres or longer, i.e. above 90 meters, perhaps up to 110 metres or 140 metres. The blade 106 transitions from a circular profile to an airfoil profile moving from the root end 1061 of the blade towards a shoulder 1063 of the blade. The shoulder 1063 may be the widest part of the blade.

The blade 106 extends between a leading edge 1064 and a trailing edge 1065 in a transverse direction. The transverse direction may also be referred to as a chordwise direction. In a transverse section of the blade, a chord extends from the leading edge 1064 to the trailing edge 1065. The blade may have a maximum chord at the shoulder 1063. The blade presents a pressure surface 1066 on a pressure side of the blade 106 and a suction surface 1067 on a suction side of the blade.

An edgewise direction is a direction which is substantially parallel with a chord of the blade. The edgewise direction is indicated in FIG. 2 with a double arrow E. A flapwise direction is a direction which is substantially perpendicular to a chord of the blade. The flapwise direction is indicated in FIG. 2 with a double arrow F. A torsional direction is a rotational direction around a longitudinal axis of the blade.

Figure 3:
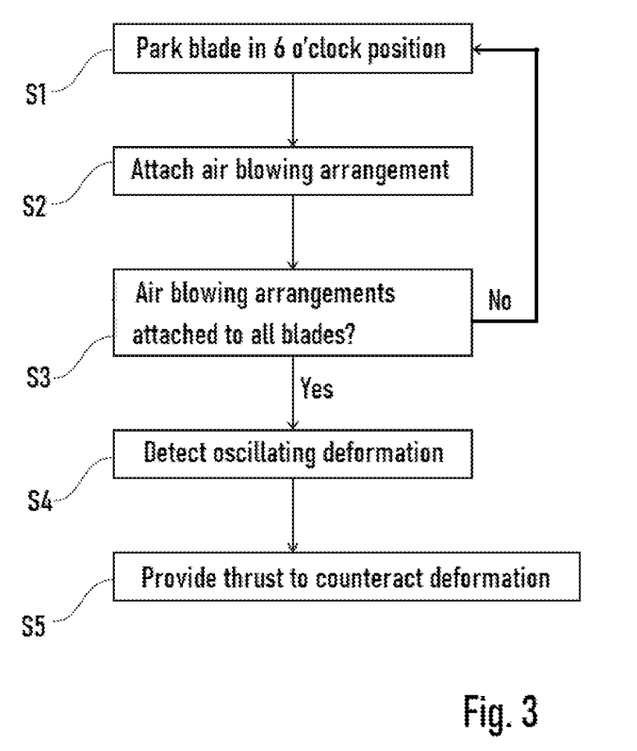
FIG. 3 is a block diagram depicting steps of a method for stabilising the blades of a wind turbine.

With reference to FIG. 3, an embodiment of a method for stabilising one or more blade 106 which are already attached to a wind turbine hub 105 will be described. It should be noted, as suggested in the summary above, that in other embodiments, a method is provided for stabilising only one of the blades of a wind turbine or all blades of a wind turbine, e.g. all blades of a wind turbine rotor 104.

The method may preferably be carried out during wind turbine construction and before commissioning thereof. Or it may for example be carried out for preparing the wind turbine for a service procedure. During the service procedure or prior to commissioning of a constructed wind turbine, actuators for blade pitch and nacelle yaw controls of the wind turbine may be without power. The method will counteract oscillations of the blades during the service procedure or e.g. during a commissioning procedure of a wind turbine.

When carrying out steps of the method, the blades 106 may be feathered. Thereby, the blades may be turned around their respective longitudinal axes, so that the chords thereof are substantially parallel with a rotational axis of the rotor 104.

Figure 4:
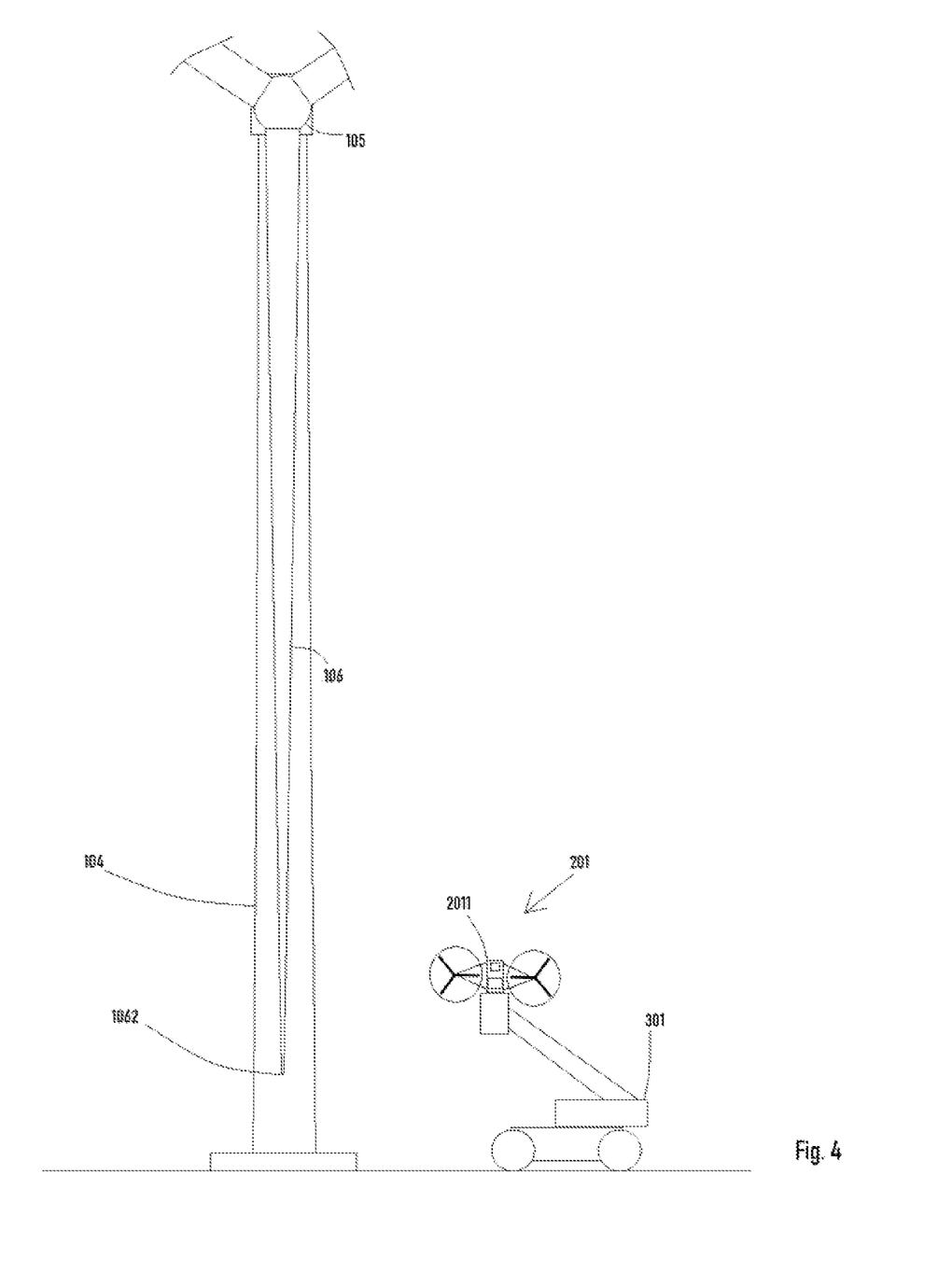
FIG. 4 is a front view of a part of a wind turbine, and a device for attaching an air blowing arrangement to a blade of the wind turbine.

Reference is also made to FIG. 4. The method comprises parking S1 one of the blades in a 6 o'clock position. As can be seen, in this position, the blade points straight down from the hub 105. While the blade is in this position, an air blowing arrangement 201 is attached S2 to the blade. The attachment of the air blowing arrangement 201 may be done by means of a lifting device 301. In this example, the lifting device 301 may be a so-called cherry picker. The air blowing arrangement 201 is lifted to the blade 106 by means of the lifting device 301.

The air blowing arrangement 201 forms a part of an apparatus for counteracting an oscillation of the blade 106. The air blowing arrangement 201 comprises an attachment device 2011 for attaching the air blowing arrangement 201 to the blade 106. The attachment device 2011 may be provided in any suitable form, e.g. with a gripping device, as exemplified in the summary above. The air blowing arrangement 201 is preferably attached close to the tip end 1062 of the blade.

The attachment procedure S1, S2 is repeated until an air blowing arrangement is attached S3 to all blades of the wind turbine. The rotor may be rotated for each attachment procedure, so that the respective blade is parked S1 in the 6 o'clock position.

Figure 5:
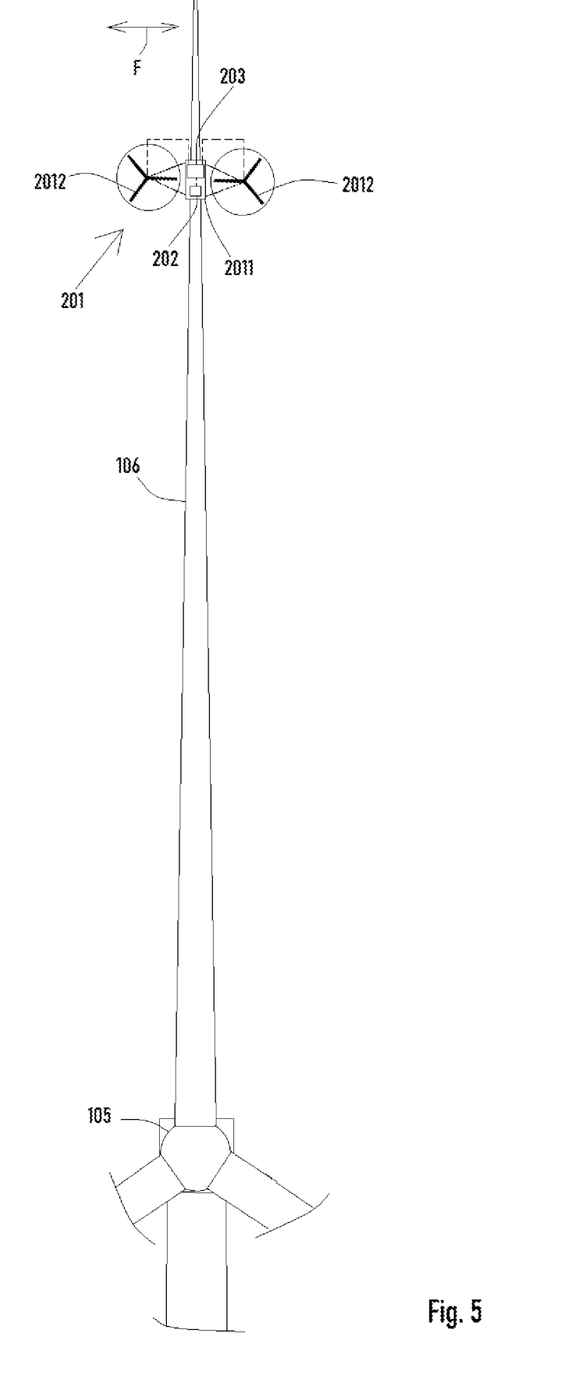
FIG. 5 is a front view of a part of the wind turbine in FIG. 4, with the air blowing arrangement attached to the blade.

Reference is made also to FIG. 5. The method comprises detecting S4 an oscillation of a blade 106 of the wind turbine. Thereby, the blade may be in any position around the hub 105. For example, the blade may be in the 12 o'clock position, as shown in FIG. 5.

The apparatus for counteracting an oscillation of the blade 106 comprises a sensor 202 for detecting an oscillation of the blade. The sensor may be an accelerometer 202. The sensor may be mounted to the air blowing arrangement 201, as exemplified in FIG. 5. Alternatively, the sensor 202, e.g. in the form of an accelerometer, may be mounted on the blade 106.

The sensor for detecting an oscillation may alternatively be a strain gauge. The strain gauge may be mounted to the blade 106, e.g. as exemplified below with reference to FIG. 6. In some embodiments, more than one sensor may be provided for detecting a blade oscillation. The sensors may be of the same type, or of different types.

The apparatus for counteracting an oscillation of the blade 106 comprises a control unit 203. The control unit 203 is provided with a computer program comprising program code means. The control unit 203 is adapted to control the attached air blowing arrangement, in dependence on signals from the sensor, to provide one or more thrusts to counteract the oscillation. The signals may be received by the control unit 203 from the sensor 202 by means of a wire communication.

The signals may be indicative of an oscillation of the blade. The oscillation may be in the edgewise direction E (FIG. 2). The oscillation may be in the flapwise direction E, or in the torsional direction. The oscillation may be in a combination of two or more of these directions, as exemplified above in the summary.

The method may comprise determining, in dependence on the signals, a frequency of the oscillation.

The control unit 203 controls S5, in dependence on the signals, the air blowing arrangement 201, to provide one or more thrusts to counteract the oscillation. The air blowing arrangement may comprise two blowers 2012. The blowers may, as in this example, be provided in the form propellers 2012. The control unit 203 may be arranged to control motors (not shown) arranged to drive the propellers 2012. For example, the control unit 203 may be arranged to control the rotational speed of the propellers. The control unit 203 may be arranged to send control signals to the air blowing arrangement by means of a wire connection, or by a wireless connection.

The blowers 2012 may be arranged to provide a thrust in a transverse direction of the blade. The blowers 2012 may be arranged to provide a thrust in the edgewise direction E of the blade. Thereby, the blowers may be adapted to counteract an edgewise oscillation. Alternatively, the blowers 2012 may be arranged to provide a thrust in the flapwise F direction of the blade. Thereby, the blowers may be adapted to counteract a flapwise oscillation.

The air blowing arrangement may be operated S5 to provide a plurality of thrusts to be synchronised with a frequency which is the same as, or a multiple of, the frequency of the oscillation. The oscillation may comprise first and second alternating movements in opposite directions. The air blowing arrangement 201 may be operated to provide a sequence of first thrusts, synchronised with the oscillations, in a direction which is at least partly the same as the direction of the first movement. This may be done by means of one of the blowers 2012. The first thrusts may cause, by means of the attachment of the air blowing arrangement 201 to the blade 106, a sequence of first reaction forces to the blade, in a direction which is at least partly the opposite to the direction of the first movement. The first reaction forces may counteract the oscillation.

Simultaneously, the air blowing arrangement 201 may be operated to provide a sequence of second thrusts, synchonised with the oscillations, in a direction which is at least partly the same as the direction of the second movement. This may be done by means of the other of the blowers 2012. The second thrusts may cause, by means of the attachment of the air blowing arrangement 201 to the blade 106, a sequence of second reaction forces to the blade, in a direction which is at least partly the opposite to the direction of the second movement. The second reaction forces may counteract the oscillation.

Thus, the air blowing arrangement 201 may provide to the blade a sequence of alternate reaction forces in opposite directions, which are synchronised with the oscillation, so as to counteract the oscillation.

In embodiments of the invention, one or more blowers 2012 may, as in this example, be offset from a centre axis of a torsional oscillation of the blade. Where the blower(s) is/are arranged to direct thrusts in the transverse direction of the blade, the offset position of the blower(s) will allow for using the blower(s) to counteract a torsional oscillation of the blade. In embodiments, a further step after step S5 may include continuing oscillation monitoring. This may be carried out by its control system. If no more oscillation is detected, the action of the air blowing arrangement 201 may be stopped.

Figure 6:
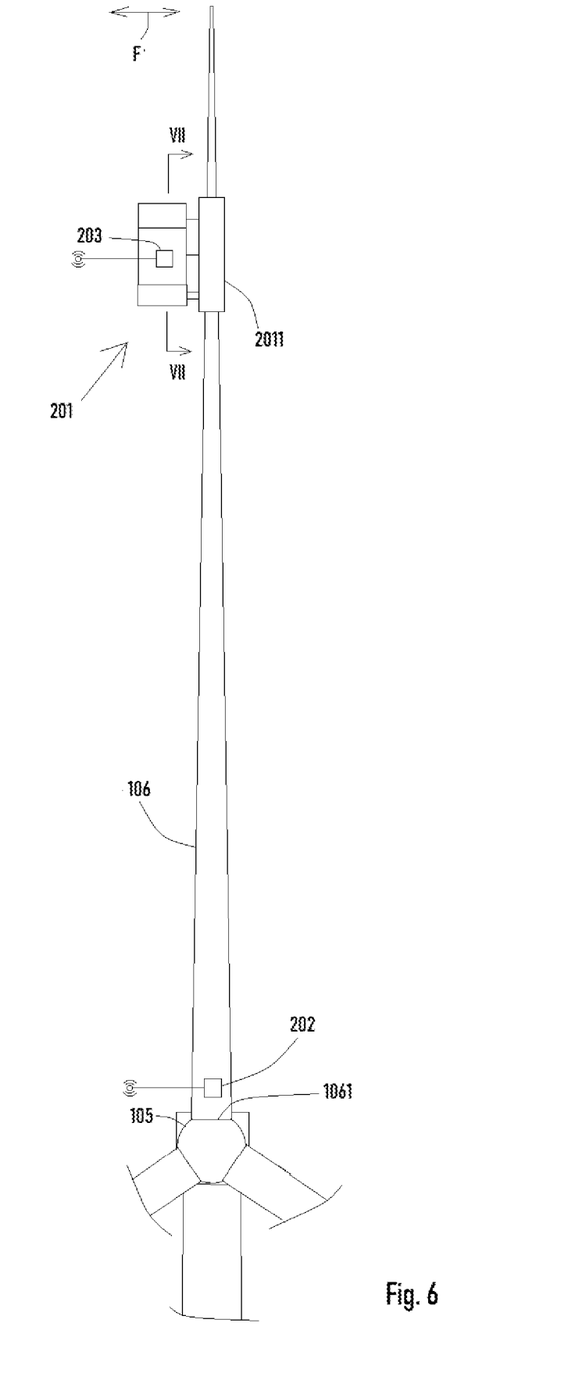
FIG. 6 is a front view of a part of a wind turbine, with an air blowing arrangement according to another embodiment of the invention, attached to a blade of the wind turbine.
Figure 7:
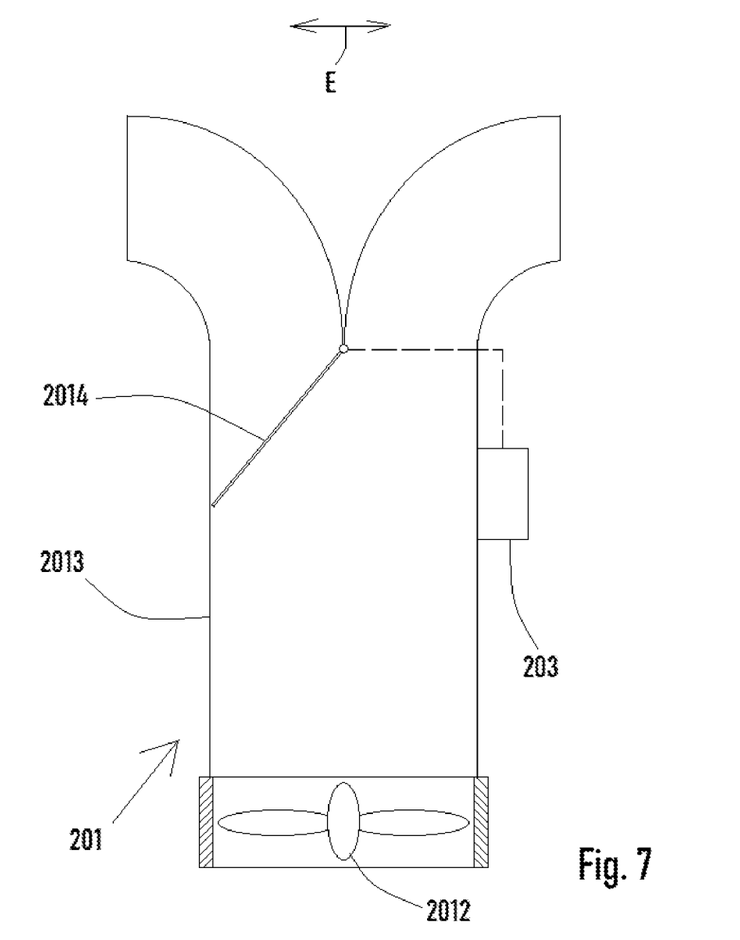
FIG. 7 shows a cross-section of the air blowing arrangement in FIG. 6, with the section oriented as indicated with the arrows VII-VII in FIG. 6.

Reference is made to FIG. 6 and FIG. 7, showing a blade 106, with an apparatus for counteracting oscillations of the blade, according to another embodiment of the invention.

The sensor 202 for detecting an oscillation of the blade may be a strain gauge. The strain gauge may be mounted to the blade in a position which will undergo strain in the event of an oscillation. In this example, the strain gauge is attached to the blade closer to the root end 1061 thereof than to the tip end 1062. Alternatively, the sensor may be an accelerometer. An accelerometer is preferably mounted closer to the tip end of the blade than to the root end.

The apparatus comprises an air blowing arrangement 201 for counteracting an oscillation of the blade. A control unit 203 for controlling the air blowing arrangement 201 may be mounted to the latter, or to the blade. The air blowing arrangement may comprise a blower 2012. The blower may be in the form of a fan 2012. The fan 2012 may be a ducted fan. The fan 2012 may be arranged to provide a thrust in the longitudinal direction of the blade 106.

The air blowing arrangement may comprise a duct 2013 arranged to lead a thrust from the blower 2012 either in a first transverse direction, or in a second transverse direction which is opposite to the first transverse direction. The transverse directions may be parallel with the edgewise direction E (FIG. 2). The selection between guiding the thrust in the first or second transverse direction may be done by means of a thrust guiding device 2014. In this example, the thrust guiding device is in the form of a valve 2014. The control unit 203 may be arranged to control the thrust guiding device 2014. The control unit 203 may be arranged to send control signals to an actuator of the thrust guiding device 2014 by means of a wire connection, or by a wireless connection. Thereby, the thrust guiding device 2014 may be controlled so as to provide alternating thrusts in the first and second transverse directions, so as to counteract an oscillation of the blade.

As will be understood by those skilled in the present field of art, numerous changes and modifications may be made to the above described and other embodiments of the present invention, without departing from its scope as defined in the appending claims.

The invention claimed is:

1. A method for stabilising a wind turbine blade, the method comprising,
attaching an air blowing arrangement to the blade,
detecting an oscillation of the blade, and
operating the attached air blowing arrangement to provide a thrust to counteract the oscillation.

2. The method according to claim 1, wherein the oscillation comprises first and second alternating movements in opposite directions, and wherein the air blowing arrangement is operated to provide a first thrust in a direction which is at least partly the same as the direction of the first movement.

3. The method according to claim 1, wherein the oscillation comprises first and second alternating movements in opposite directions, and wherein the air blowing arrangement is operated to provide a sequence of first thrusts, synchronised with the oscillation, in a direction which is at least partly the same as the direction of the first movement.

4. The method according to claim 2, wherein the air blowing arrangement is operated to provide a second thrust in a direction which is at least partly the same as the direction of the second movement.

5. The method according to claim 1, wherein the blade is mounted to a wind turbine hub during the steps of detecting the oscillation, and operating the air blowing arrangement to counteract the oscillation.

6. The method according to claim 1, wherein the oscillation is an edgewise, flapwise, and/or torsional oscillation.

7. The method according to claim 1, wherein the blade comprises a tip end, and a root end adapted to be mounted to a hub of a wind turbine, wherein the air blowing arrangement is attached closer to the tip end than to the root end.

8. The method according to claim 1, wherein, during the step of attaching the air blowing arrangement to the blade, the blade is mounted to a wind turbine hub, and the blade is parked in a 6 o'clock position.

9. The method according to claim 1, further comprising:
receiving signals indicative of the oscillation of the blade, and
controlling, in dependence on the signals, the air blowing arrangement attached to the blade to provide the thrust to counteract the oscillation.

10. The method according to claim 9, further comprising determining, in dependence on the signals, a frequency of the oscillation.

11. The method according to claim 10, wherein controlling the air blowing arrangement further comprises controlling the air blowing arrangement to provide a synchronised thrust with a frequency which is the same as, or a multiple of, the frequency of the oscillation.

12. A computer program product, comprising:
a non-transitory computer readable storage medium, and
computer program code stored on the non-transitory computer readable storage medium that, when run on a computer, causes the computer to perform the steps of claim 9.

13. A control unit, comprising:
a computer including a non-transitory computer readable storage medium having a computer program code stored thereon that, when run by the computer, causes the control unit to perform the steps of claim 9.

14. An apparatus for counteracting an oscillation of a wind turbine blade, the apparatus comprising,
an air blowing arrangement comprising an attachment device for attaching the air blowing arrangement to the blade,
a sensor for detecting an oscillation of the blade, and
the control unit of claim 13 adapted to control the attached air blowing arrangement, in dependence on signals from the sensor, to provide a thrust to counteract the oscillation.

15. The method according to claim 1, wherein the step of detecting the oscillation of the blade is after the air blowing arrangement is attached to the blade.

16. The method according to claim 1, wherein the air blowing arrangement is not being operated to generate the thrust when the air blowing arrangement is attached to the blade.

17. The method according to claim 1, wherein the thrust applies a reaction force to the wind turbine blade to counteract the oscillation.

18. The method according to claim 1, wherein the thrust is synchronised with the oscillation.

19. The method according to claim 18, wherein the thrust is synchronised with a frequency of the oscillation.

* * * * *